United States Patent Office.

MORITZ ULRICH, OF ELBERFELD, GERMANY, ASSIGNOR TO THE FARBENFABRIKEN, VORMALS FR. BAYER & CO., OF SAME PLACE.

AZO-BLUE COLOR.

SPECIFICATION forming part of Letters Patent No. 415,258, dated November 19, 1889.

Application filed August 29, 1889. Serial No. 322,349. (Specimens.)

*To all whom it may concern:*

Be it known that I, MORITZ ULRICH, doctor of philosophy, of Elberfeld, in the Empire of Germany, assignor to the FARBENFABRIKEN, VORMALS FR. BAYER & CO., have invented a new and useful Improvement in the Manufacture of Dye-Stuffs or Coloring-Matters, of which the following is a specification.

My invention relates to the production of new blue azo color for dyeing cotton, wool, and silk by the action of tetrazo-diphenolalkyl ether upon dioxynaphthaline monosulpho-acid, which is obtained by melting beta-naphthol beta-disulpho-acid (so-called "G" acid) with caustic soda.

In carrying out my process practically I proceed as follows: Ten (10) kilos diamido-diphenol ether (diphenetidin) are dissolved in one hundred and fifty liters water and twenty (20) kilos muriatic acid of the specific gravity of 1.161. To this solution, cooled by ice, five (5) kilos sodium nitrite dissolved in water are gradually added. The reddish-yellow solution of tetrazo-diphenol ether so obtained is thereupon allowed to run slowly into an alkaline solution of twenty-two (22) kilos of the soda salt of dioxynaphthaline monosulpho-acid produced by melting beta-naphthol beta or gamma disulpho-acid (G acid) with caustic alkali, by which process a new isomer is obtained, which has been invented by me, and for which I have made a separate application. A blue precipitate is immediately formed, which, after a short time, is filtered and dried.

My new product thus obtained forms a black amorphous powder, dissolves easily in hot water, giving a blue solution, which is not changed by adding alkali, while the blue watery solution of the product gained by the combination of tetrazo-diphenol ether with the isomeric dioxynaphthaline monosulpho-acid of the beta-naphthol alpha-disulpho-acid (R salt) turns red by adding caustic alkali. By concentrated sulphuric acid it forms a deep-green blue color. It dyes cotton not mordanted in a boiling soap bath a deep indigo-blue, being fast to soap and mineral acids.

What I claim as my invention, and desire to secure by Letters Patent, is—

The coloring-matter herein described, which is produced by the action of tetrazo-diphenol ether upon the dioxynaphthaline monosulpho-acid gained by melting beta-naphthol beta or gamma disulpho-acid with caustic alkali, and which forms a black amorphous powder, giving a blue solution when dissolved in water, which remains blue on adding caustic alkali, and forming a deep-green blue color with concentrated sulphuric acid and dyeing cotton not mordanted in an alkaline soap bath blue, fast to soap and mineral acids.

In testimony whereof I have signed my name in presence of two subscribing witnesses.

MORITZ ULRICH.

Witnesses:
CARL DUISBERG,
RICHARD LAUCH.